US009502990B2

(12) United States Patent
Hsiao et al.

(10) Patent No.: US 9,502,990 B2
(45) Date of Patent: Nov. 22, 2016

(54) ELECTRIC POWER FEEDBACK APPARATUS WITH MAIN POWER OUTPUT-FEEDBACK AND STANDBY POWER OUTPUT-FEEDBACK

(71) Applicant: Chicony Power Technology Co., Ltd., New Taipei (TW)

(72) Inventors: Chang-Cheng Hsiao, New Taipei (TW); Tzu-Hung Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 221 days.

(21) Appl. No.: 14/275,512

(22) Filed: May 12, 2014

(65) Prior Publication Data

US 2015/0326107 A1 Nov. 12, 2015

(51) Int. Cl.
| | |
|---|---|
| *H02M 3/04* | (2006.01) |
| *H02M 7/12* | (2006.01) |
| *H02M 7/5387* | (2007.01) |
| *G05F 1/63* | (2006.01) |
| *H02M 1/00* | (2006.01) |

(52) U.S. Cl.
CPC .............. *H02M 7/12* (2013.01); *G05F 1/63* (2013.01); *H02M 3/04* (2013.01); *H02M 7/5387* (2013.01); *H02M 2001/009* (2013.01); *H02M 2001/0035* (2013.01); *Y02B 70/16* (2013.01)

(58) Field of Classification Search
CPC ....................................................... H02M 3/04
USPC .......................................................... 323/234
See application file for complete search history.

(56) References Cited

U.S. PATENT DOCUMENTS

| | | | | |
|---|---|---|---|---|
| 2004/0004458 A1* | 1/2004 | Tanaka | ..................... | H02J 7/022 320/106 |
| 2004/0170031 A1* | 9/2004 | Tomiyama | .......... | H02M 3/3385 363/21.16 |
| 2008/0136342 A1* | 6/2008 | Tamegai | ........... | H02M 3/33507 315/209 R |
| 2011/0057588 A1* | 3/2011 | Rineh | ....................... | H02P 3/18 318/380 |

FOREIGN PATENT DOCUMENTS

| | | |
|---|---|---|
| TW | 200636418 A | 10/2006 |
| TW | 201040710 A1 | 11/2010 |
| TW | 201206032 A | 2/2012 |
| TW | 201207607 A | 2/2012 |
| TW | 201220633 A1 | 5/2012 |
| TW | I425749 B | 2/2014 |

* cited by examiner

*Primary Examiner* — Jeffrey Gblende
*Assistant Examiner* — Trinh Dang
(74) *Attorney, Agent, or Firm* — Muncy, Geissler, Olds & Lowe, P.C.

(57) ABSTRACT

An electric power feedback apparatus is electrically connected to a power supply apparatus. The power supply apparatus includes a power supply module, a main power output terminal and a standby power output terminal. The main power output terminal and the standby power output terminal output electric power to a power conversion system respectively. The electric power feedback apparatus includes a constant voltage compensating module, a compensating and clamping module, an adaptive current weighting module and a controller. The constant voltage compensating module is electrically connected to the main power output terminal. The compensating and clamping module is electrically connected to the standby power output terminal, the constant voltage compensating module and the power conversion system. The adaptive current weighting module is electrically connected to the standby power output terminal, the constant voltage compensating module and the power conversion system.

7 Claims, 4 Drawing Sheets

ELECTRIC POWER FEEDBACK APPARATUS WITH MAIN POWER OUTPUT-FEEDBACK AND STANDBY POWER OUTPUT-FEEDBACK

BACKGROUND OF THE INVENTION

Field of the Invention

The present invention relates to a power supply system, and especially relates to a power supply system with a main power output-feedback and a standby power output-feedback.

Description of the Related Art

FIG. 1 shows a circuit diagram of a related art power supply system. A power supply system 1 comprises a power supply apparatus 10 and an electric power feedback control module 12. The power supply apparatus 10 comprises a main power output terminal Vo1 and a standby power output terminal Vo2. The electric power feedback control module 12 is electrically connected to the main power output terminal Vo1. The main power output terminal Vo1 and the standby power output terminal Vo2 are electrically connected to a power conversion system PS respectively. The main power output terminal Vo1 and the standby power output terminal Vo2 output electric power to the power conversion system PS for a working status and a standby status respectively. In another word, the main power output terminal Vo1 of the power supply apparatus 10 outputs electric power (for example, a direct current power 12 volts) to the power conversion system PS when the power conversion system PS is in the working status. The standby power output terminal Vo2 of the power supply apparatus 10 outputs electric power to the power conversion system PS when the power conversion system PS is in the standby status for energy saving.

The electric power feedback control module 12 comprises a controller 120, an isolation unit 122 and a voltage compensating unit 124. The voltage compensating unit 124 is electrically connected to the main power output terminal Vo1. The isolation unit 122 is electrically connected to the voltage compensating unit 124 and the controller 120. The controller 120 is electrically connected to the power supply apparatus 10.

The voltage compensating unit 124 of the electric power feedback control module 12 detects an output electric power of the main power output terminal Vo1. The voltage compensating unit 124 outputs a signal to the isolation unit 122 if an output voltage value of the main power output terminal Vo1 is lower than a predetermined voltage value. The controller 120 is configured to control the power supply apparatus 10 to increase the output electric power of the main power output terminal Vo1 according to the signal mentioned above.

The electric power feedback control module 12 mainly detects the voltage value of the output electric power of the main power output terminal Vo1. The electric power feedback control module 12 informs the controller 120 to control the power supply apparatus 10 to decrease or increase the voltage value of the output electric power of the main power output terminal Vo1 if the voltage value mentioned above is higher or lower than the predetermined voltage value. In another word, the electric power feedback control module 12 monitors the voltage value of the output electric power of the main power output terminal Vo1 when the power conversion system PS is in the working status, so that the voltage value mentioned above is maintained in a specific range.

However, a voltage value of the output electric power of the standby power output terminal Vo2 cannot feedback to the power supply apparatus 10 when the power conversion system PS is in the standby status. The output electric power of the standby power output terminal Vo2 is enough for the power conversion system PS when the power conversion system PS is in the standby status and with a very light load. However, the voltage value of the output electric power of the standby power output terminal Vo2 is decreased when the power conversion system PS is in the standby status and with a conventional load (for example, a microprocessor of the power conversion system PS is operating or the power conversion system PS is supplying power to an electronic device, such as a cellphone). Therefore, the output electric power of the standby power output terminal Vo2 may be not enough for the power conversion system PS to maintain in the standby status.

SUMMARY OF THE INVENTION

In order to solve the problems mentioned above, an object of the present invention is to provide an electric power feedback apparatus for detecting the output electric power of the main power output terminal and the standby power output terminal. Another object of the present invention is to provide an electric power feedback method.

In order to achieve the object mentioned above, the electric power feedback apparatus is electrically connected to a power supply apparatus. The power supply apparatus comprises a power supply module, a first inductive resistor, a second inductive resistor, a main power output terminal and a standby power output terminal. The main power output terminal and the standby power output terminal are electrically connected to a power conversion system. The power supply module comprises a first power output terminal and a second power output terminal. The first inductive resistor is electrically connected to the first power output terminal and the main power output terminal. The second inductive resistor is electrically connected to the second power output terminal and the standby power output terminal.

The electric power feedback apparatus comprises a constant voltage compensating module, a compensating and clamping module, an adaptive current weighting module and a controller. The constant voltage compensating module is electrically connected to the main power output terminal. The compensating and clamping module is electrically connected to the standby power output terminal, the constant voltage compensating module and the power conversion system. The adaptive current weighting module is electrically connected to the standby power output terminal, the constant voltage compensating module and the power conversion system. The controller is electrically connected to the constant voltage compensating module and the power supply apparatus.

Moreover, the electric power feedback apparatus further comprises a first isolation unit. The first isolation unit is arranged between the constant voltage compensating module and the controller. A signal transmitting terminal of the first isolation unit is electrically connected to the constant voltage compensating module. A signal receiving terminal of the first isolation unit is electrically connected to the controller.

Moreover, the compensating and clamping module comprises a first comparator, a constant voltage weighting unit and a switch element. The first comparator is electrically connected to the standby power output terminal. The constant voltage weighting unit is electrically connected to the first comparator. The switch element is electrically connected to the constant voltage compensating module, the constant voltage weighting unit and the power conversion system.

Moreover, the adaptive current weighting module comprises an amplifier, a switchover element and an inverter. The amplifier is electrically connected to the standby power output terminal and the second power output terminal. The switchover element is electrically connected to the comparator and the power conversion system. The inverter is electrically connected to the switchover element and the constant voltage compensating module.

Moreover, the electric power feedback apparatus further comprises a standby power detection module. The standby power detection module is electrically connected to the standby power output terminal, the constant voltage compensating module, the controller and the power conversion system.

Moreover, the standby power detection module comprises a second comparator and a start element. The second comparator is electrically connected to the standby power output terminal. The start element is electrically connected to the second comparator, the controller and the power conversion system.

Moreover, the electric power feedback apparatus further comprises a second isolation unit. The second isolation unit is arranged between the standby power detection module and the controller. A signal transmitting terminal of the second isolation unit is electrically connected to the start element of the standby power detection module. A signal receiving terminal of the second isolation unit is electrically connected to the controller.

Moreover, the electric power feedback apparatus further comprises an inverting element. The inverting element is arranged between the second isolation unit and the controller. The inverting element is electrically connected to the signal receiving terminal of the second isolation unit and the controller.

In order to achieve another object mentioned above, the electric power feedback method is applied to a power supply apparatus. The power supply apparatus comprises a main power output terminal and a standby power output terminal. The main power output terminal and the standby power output terminal output electric power to a power conversion system respectively. The electric power feedback method comprises following steps (a)~(e). Step (a): detects whether the power conversion system is in a standby mode or not. Step (b): detects whether a voltage value of an output electric power of the standby power output terminal is equal to a first predetermined value or not when the power conversion system is in the standby mode. Step (c): after step (b), detects whether the voltage value of the output electric power of the standby power output terminal is less than a second predetermined value or not if the voltage value of the output electric power of the standby power output terminal is not equal to the first predetermined value, wherein the second predetermined value is less than the first predetermined value. Step (d): after step (c), enters a constant voltage clamping mode if the voltage value of the output electric power of the standby power output terminal is greater than the second predetermined value. Step (e): a current weighting control feedback is executed.

Moreover, after step (b), the current weighting control feedback is executed if the voltage value of the output electric power of the standby power output terminal is equal to the first predetermined value.

DETAILED DESCRIPTION OF THE INVENTION

Figure 1:
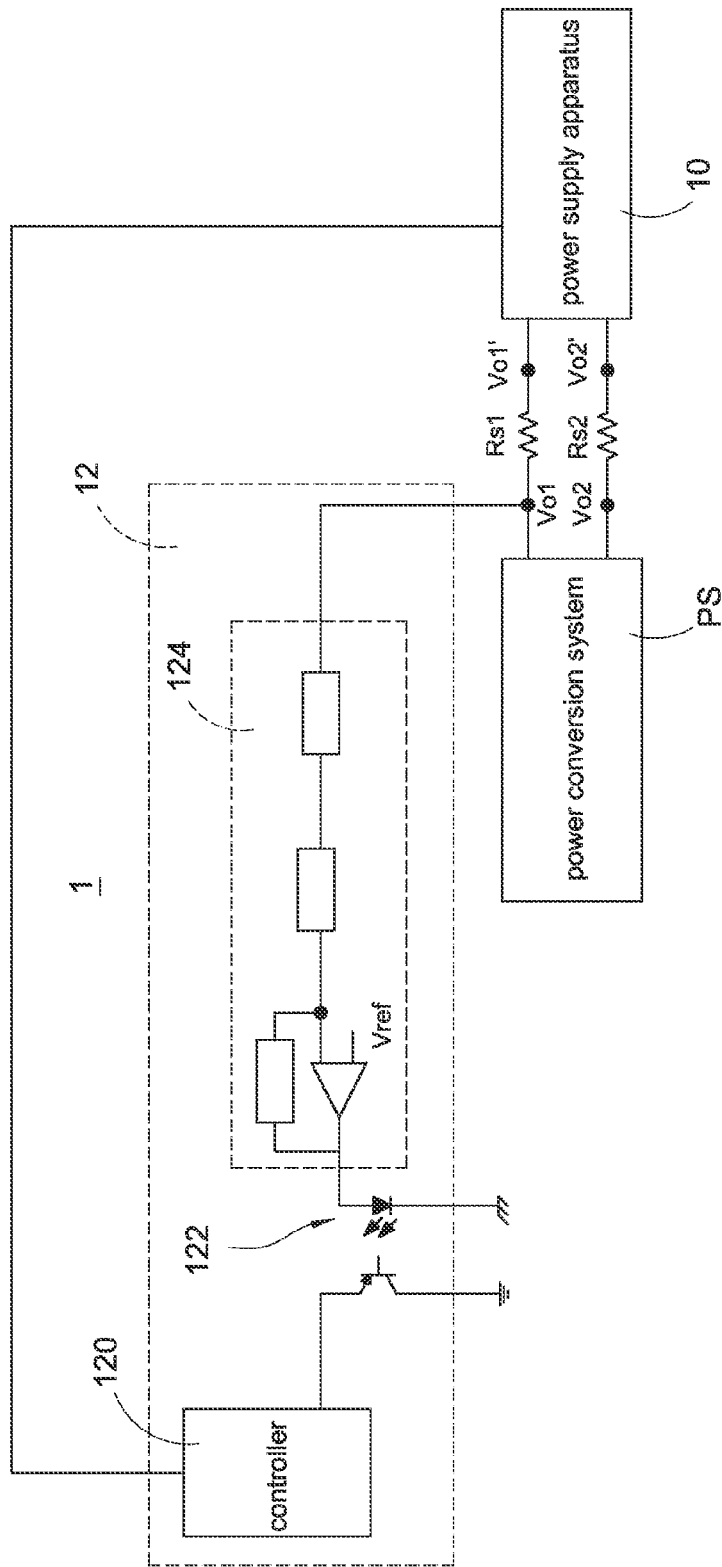
FIG. 1 shows a circuit diagram of a related art power supply system.
Figure 2:
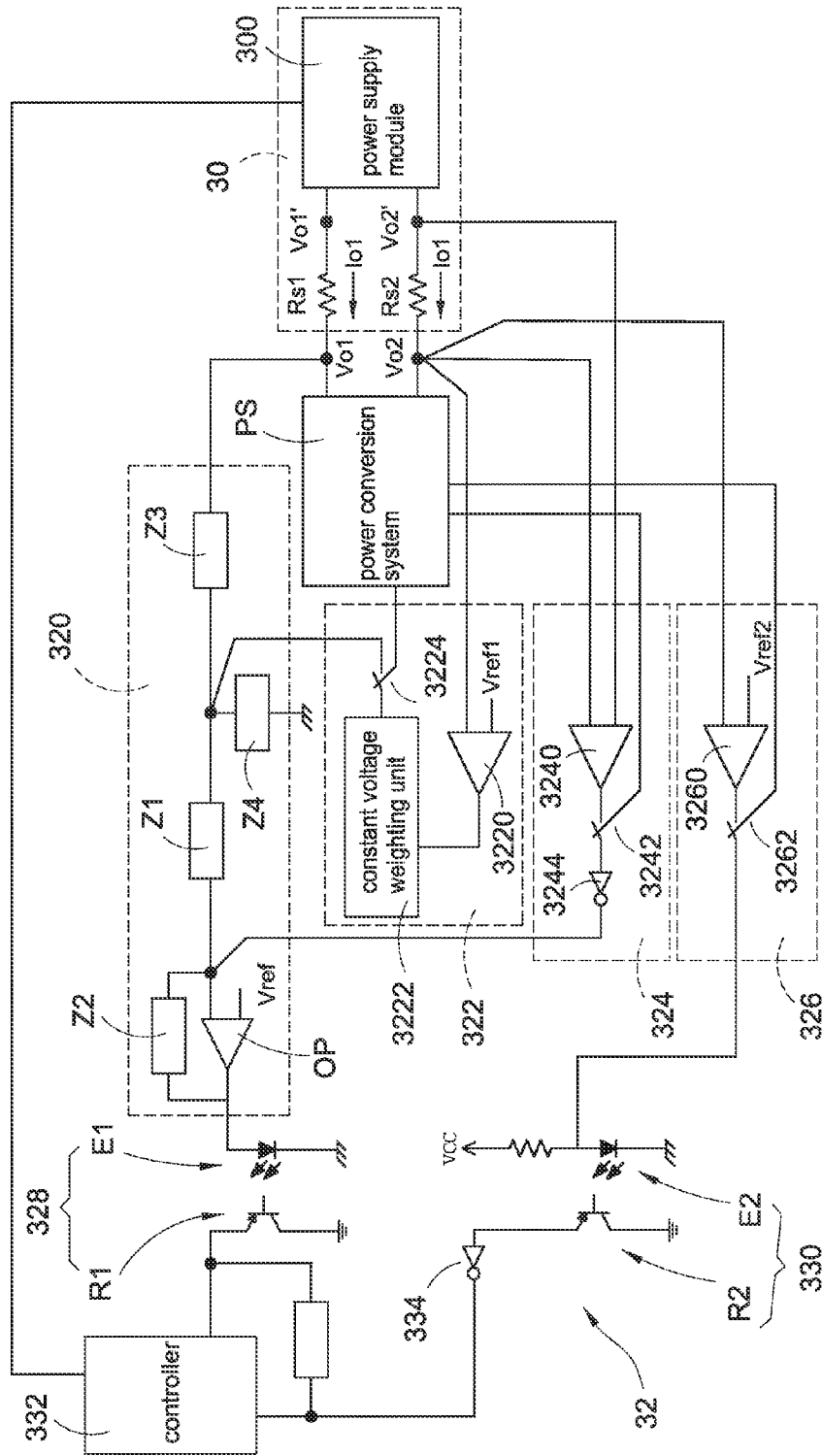
FIG. 2 shows a circuit diagram of the power supply system of the present invention.

FIG. 2 shows a circuit diagram of the power supply system of the present invention. A power supply system 3 comprises a power supply apparatus 30 and an electric power feedback apparatus 32. The power supply apparatus 30 comprises a power supply module 300, a first inductive resistor Rs1, a second inductive resistor Rs2, a main power output terminal Vo1 and a standby power output terminal Vo2. The power supply module 300 comprises a first power output terminal Vo1' and a second power output terminal Vo2'. The first inductive resistor Rs1 is electrically connected to the first power output terminal Vo1' and the main power output terminal Vo1. The second inductive resistor Rs2 is electrically connected to the second power output terminal Vo2' and the standby power output terminal Vo2. The main power output terminal Vo1 and the standby power output terminal Vo2 are electrically connected to a power conversion system PS respectively.

The power supply apparatus 30 outputs electric power to the power conversion system PS through the main power output terminal Vo1 to supply electric power for the power conversion system PS in a working status when the power conversion system PS is in the working status. The power supply apparatus 30 outputs electric power to the power conversion system PS through the standby power output terminal Vo2 to supply electric power for the power conversion system PS in a standby status when the power conversion system PS is in the standby status.

Figure 3:
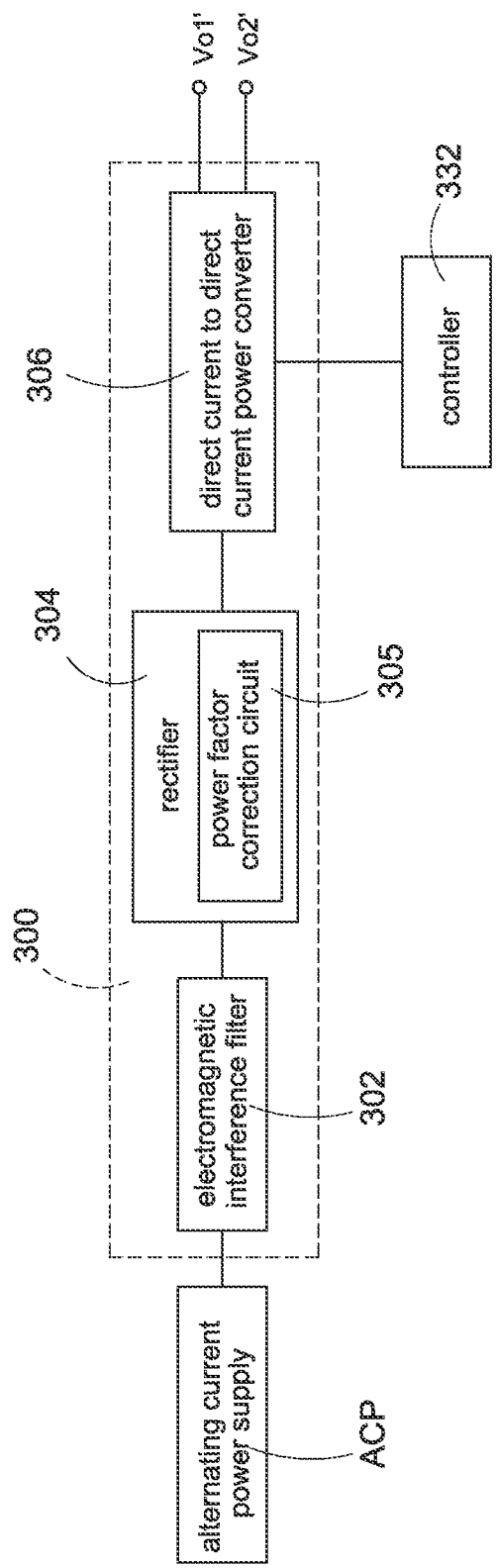
FIG. 3 shows a block diagram of the power supply module of the present invention.

FIG. 3 shows a block diagram of the power supply module of the present invention. The power supply module 300 comprises an electromagnetic interference filter 302, a rectifier 304 and a direct current to direct current power converter 306. The electromagnetic interference filter 302 is electrically connected to an external alternating current power supply ACP. The rectifier 304 is electrically connected to the electromagnetic interference filter 302. The direct current to direct current power converter 306 is electrically connected to the rectifier 304. The electromagnetic interference filter 302 receives an alternating current electric power outputted from the alternating current power supply ACP. An electromagnetic interference of the alternating current electric power is filtered by the electromagnetic interference filter 302. The alternating current electric power which is filtered out the electromagnetic interference by the electromagnetic interference filter 302 is converted into a direct current electric power. The rectifier 304 can comprise a power factor correction circuit 305 for decreasing output current. The direct current to direct current power converter 306 comprises the first power output terminal Vo1' and the second power output terminal Vo2' mentioned above. The direct current to direct current power converter 306 is, for example but not limited to, an LLC resonant direct current to direct current converter.

The electric power feedback apparatus 32 comprises a constant voltage compensating module 320, a compensating and clamping module 322, an adaptive current weighting module 324, a standby power detection module 326, a first isolation unit 328, a second isolation unit 330 and a controller 332.

The constant voltage compensating module 320 is electrically connected to the main power output terminal Vo1 and the first isolation unit 328. The compensating and clamping module 322 is electrically connected to the standby power output terminal Vo2, the constant voltage compensating module 320 and the power conversion system PS. The adaptive current weighting module 324 is electrically connected to the standby power output terminal Vo2, the second power output terminal Vo2', the constant voltage compensating module 320 and the power conversion system PS. The standby power detection module 326 is electrically connected to the standby power output terminal Vo2, the second isolation unit 330 and the power conversion system PS. The controller 332 is electrically connected to the first isolation unit 328 and the second isolation unit 330.

The constant voltage compensating module 320 detects the voltage value of the output electric power of the main power output terminal Vo1. The constant voltage compensating module 320 is configured to control a signal transmitting terminal E1 of the first isolation unit 328 to send out a signal if the voltage value of the electric power outputted from the main power output terminal Vo1 and sent to the power conversion system PS is less or greater than the predetermined voltage value (namely, the voltage value of the electric power outputted from the main power output terminal Vo1 is not equal to the predetermined voltage value). The signal receiving terminal R1 of the first isolation unit 328 receives the signal mentioned above and then sends the signal mentioned above to the controller 332. The controller 332 is configured to control an operation frequency or an operating period of the power supply module 300 (as shown in FIG. 3) of the power supply apparatus 30, so that the voltage value of the electric power outputted from the main power output terminal Vo1 is increased or decreased.

The constant voltage compensating module 320 comprises a first impedance Z1, a second impedance Z2, a third impedance Z3, a fourth impedance Z4 and an amplifying element OP. The first impedance Z1, the second impedance Z2, the third impedance Z3 and the fourth impedance Z4 consist of resistors, capacitors or inductors. The first impedance Z1 is electrically connected to an input terminal of the amplifying element OP. A reference voltage Vref is sent to the other input terminal of the amplifying element OP. The second impedance Z2 is electrically connected to an output terminal of the amplifying element OP and an input contact which is connected to the amplifying element OP and the first impedance Z1. The third impedance Z3 is electrically connected to the main power output terminal Vo1 and the first impedance Z1. One side of the fourth impedance Z4 is electrically connected to the first impedance Z1 and the third impedance Z3. The other side of the fourth impedance Z4 is electrically connected to a ground.

The compensating and clamping module 322 comprises a first comparator 3220, a constant voltage weighting unit 3222 and a switch element 3224. An input terminal of the first comparator 3220 is electrically connected to the standby power output terminal Vo2. A first reference voltage Vref1 is sent to the other input terminal of the first comparator 3220. An output terminal of the first comparator 3220 is electrically connected to the constant voltage weighting unit 3222.

The first comparator 3220 compares the output voltage value of the standby power output terminal Vo2 with a voltage value of the first reference voltage Vref1, and then sends the comparing result to the constant voltage weighting unit 3222. The switch element 3224 is electrically connected to the constant voltage weighting unit 3222, the fourth impedance Z4 (a contact connected to the first impedance Z1 and the third impedance Z3) of the constant voltage compensating module 320 and the power conversion system PS. The switch element 3224 is turned on or turned off according to whether the power conversion system PS is started or not, so that whether the output voltage value of the main power output terminal Vo1 is clamped or not is determined.

The compensating and clamping module 322 clamps a feedback of the constant voltage compensating module 320. The constant voltage weighting unit 3222 provides a constant voltage to the constant voltage compensating module 320 to clamp a voltage value of the feedback of the constant voltage compensating module 320, so that the constant voltage compensating module 320 cannot feedback the electric power (outputted from the main power output terminal Vo1) to the controller 332.

The adaptive current weighting module 324 comprises an amplifier 3240, a switchover element 3242 and an inverter 3244. Two input terminals of the amplifier 3240 are electrically connected to the standby power output terminal Vo2 and the second power output terminal Vo2' respectively. The switchover element 3242 is electrically connected to an output terminal of the amplifier 3240 and the power conversion system PS. An input terminal of the inverter 3244 is electrically connected to the switchover element 3242. An output terminal of the inverter 3244 is electrically connected to the input contact which is connected to the amplifying element OP, the first impedance Z1 and the second impedance Z2.

The amplifier 3240 compares the electric power outputted from the standby power output terminal Vo2 with the electric power outputted from the second power output terminal Vo2' to obtain a voltage difference value. Whether the voltage difference value mentioned above is amplified by the amplifier 3240 and sent to the constant voltage compensating module 320 through the inverter 3244 or not is determined by whether the power conversion system PS is started or not. The inverter 3244 sends out a signal to decrease a level of the input terminal of the amplifying element OP of the constant voltage compensating module 320 when the power conversion system PS is in the standby mode and the voltage difference value mentioned above is greater than a predetermined difference value. Therefore, the output terminal of the amplifying element OP sends out a signal to drive the first isolation unit 328. The controller 332 is configured to adjust the operation frequency or the operating period of the power supply module 300, so that the output voltage value of the standby power output terminal Vo2 of the power supply module 300 is increased.

The standby power detection module 326 comprises a second comparator 3260 and a start element 3262. An input terminal of the second comparator 3260 is electrically connected to the standby power output terminal Vo2. A second reference voltage Vref2 is sent to the other input terminal of the second comparator 3260. The start element 3262 is electrically connected to an output terminal of the second comparator 3260, the power conversion system PS and the second isolation unit 330. The start element 3262 determines whether a comparing result (namely, the second comparator 3260 compares the voltage of the standby power output terminal Vo2 with the second reference voltage Vref2 to obtain the comparing result) is sent to the controller 332 through the second isolation unit 330 or not, according to whether the power conversion system PS is started or not. The second isolation unit 330 is, for example but not limited to, an optical coupler. A signal transmitting terminal E2 of the second isolation unit 330 is electrically connected to the start element 3262. A signal receiving terminal R2 of the second isolation unit 330 is electrically connected to the controller 332 through a inverting element 334.

Please refer to FIG. 3 again. The controller 332 is electrically connected to the direct current to direct current power converter 306. The direct current to direct current power converter 306 receives the direct current electric power through the rectifier 304. The controller 332 is configured to control the direct current to direct current power converter 306 to change the voltage values of the output electric power of the first power output terminal Vo1' and the second power output terminal Vo2'.

Please refer to FIG. 2 again. In an embodiment, the main power output terminal Vo1 and the standby power output terminal Vo2 of the power supply apparatus 30 output electric power to the power conversion system PS respectively when the power conversion system PS is in the working status. The constant voltage compensating module 320 detects the voltage value of the output electric power of the main power output terminal Vo1 and then feedbacks the voltage value mentioned above to the controller 332. The controller 332 is configured to control the operation frequency or the operating period of the power supply apparatus 30 to change the voltage value of the output electric power of the main power output terminal Vo1 according to the voltage value mentioned above. More specifically, the controller 332 is configured to control the operation frequency of the direct current to direct current power converter 306 (as shown in FIG. 3) to adjust the voltage value of the output electric power of the first power output terminal Vo1' to maintain the power conversion system PS.

The main power output terminal Vo1 of the power supply apparatus 30 stops outputting electric power when the power conversion system PS is in the standby status. Moreover, the power supply apparatus 30 outputs electric power to the power conversion system PS only through the standby power output terminal Vo2 to maintain the power conversion system PS in the standby status when the power conversion system PS is in the standby status. In the meantime, the electric power feedback apparatus 32 enters a burst mode. In another word, the electric power feedback apparatus 32 is in the burst mode when the power conversion system PS is in the standby status.

The adaptive current weighting module 324 feedbacks a current (outputted from the standby power output terminal Vo2) to the controller 332 when the electric power feedback apparatus 32 is in the burst mode and when the standby power detection module 326 detects that the output voltage value of the standby power output terminal Vo2 is equal to a first predetermined value. In another word, the electric power feedback apparatus 32 executes a current weighting control feedback.

When the electric power feedback apparatus 32 is in the burst mode and when the standby power detection module 326 detects that the output voltage value of the standby power output terminal Vo2 is less than a second predetermined value, the controller 332 is configured to control the power supply apparatus 30 to increase the voltage of the main power output terminal Vo1, so that the power supply system 3 leaves the burst mode and the main power output terminal Vo1 outputs electric power to the power conversion system PS. In another word, the electric power feedback apparatus 32 stops operating in the burst mode when the standby power detection module 326 detects that the output voltage value of the standby power output terminal Vo2 is less than the second predetermined value. Moreover, the second predetermined value is less than the first predetermined value.

When the electric power feedback apparatus 32 is in the burst mode and when the standby power detection module 326 detects that the output voltage value of the standby power output terminal Vo2 is between the first predetermined value and the second predetermined value, a constant voltage is sent from the compensating and clamping module 322 to the constant voltage compensating module 320 to clamp the feedback voltage value of the constant voltage compensating module 320, so that the constant voltage compensating module 320 enters a constant voltage clamping mode and cannot feedback the electric power (outputted from the main power output terminal Vo1) to the controller 332.

Figure 4:
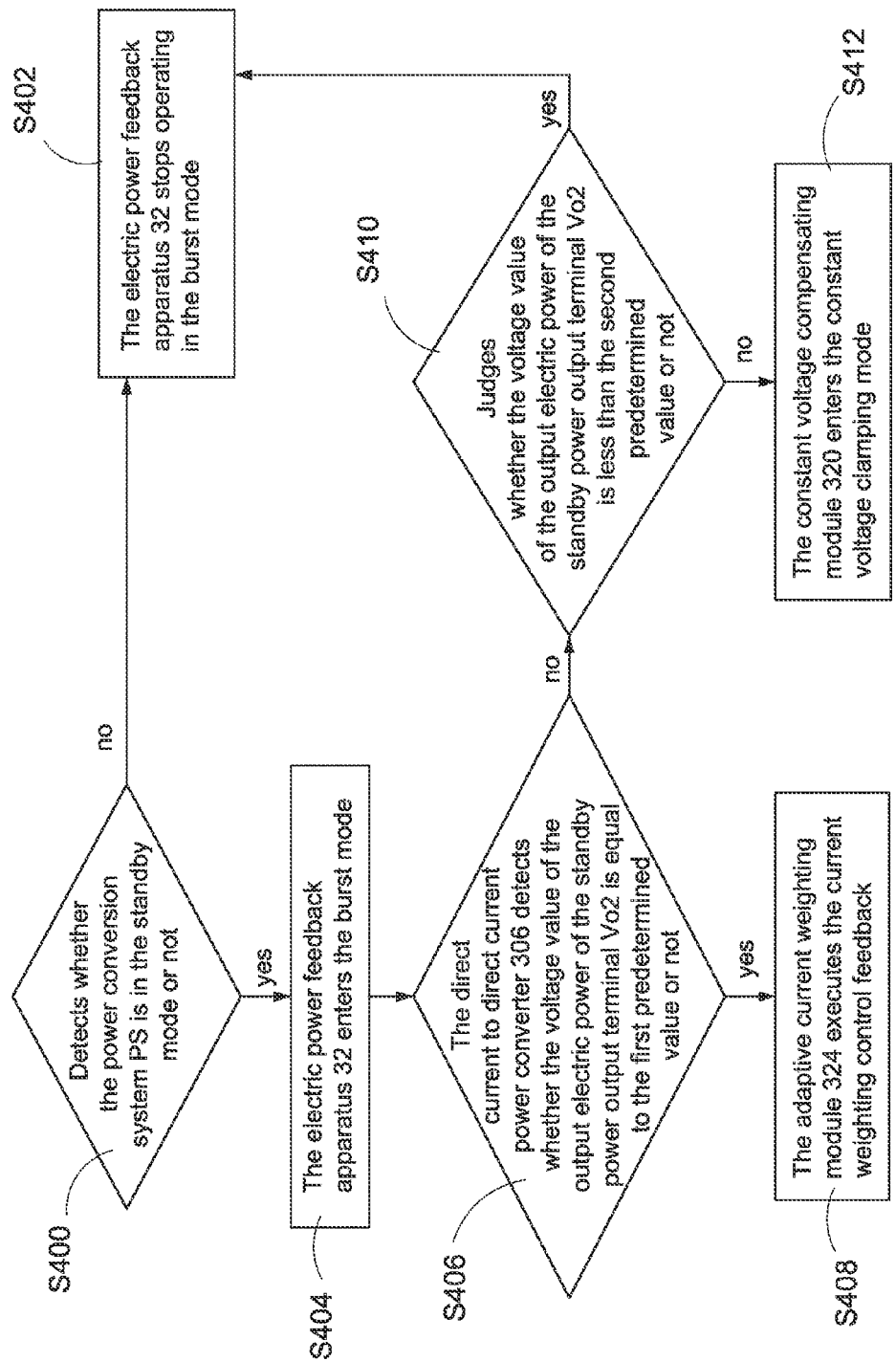
FIG. 4 shows a flow chart of the electric power feedback method of the present invention.

FIG. 4 shows a flow chart of the electric power feedback method of the present invention. First, detects whether the power conversion system PS is in the standby mode or not (step S400). The constant voltage compensating module 320 of the electric power feedback apparatus 32 feedbacks the voltage value of the output electric power of the main power output terminal Vo1 to the controller 332 when the power conversion system PS is not in the standby mode (namely, the power conversion system PS is in the working mode). The controller 332 is configured to adjust the voltage value of the output electric power of the main power output terminal Vo1 of the power supply apparatus 30 to maintain the power conversion system PS according to the voltage value mentioned above. In another word, the electric power feedback apparatus 32 stops operating in the burst mode when the power conversion system PS is in the working mode (step S402).

The electric power feedback apparatus 32 enters the burst mode when the power conversion system PS is in the standby mode (step S404). The burst mode comprises following steps. First, the direct current to direct current power converter 306 detects whether the voltage value of the output electric power of the standby power output terminal Vo2 is equal to the first predetermined value or not (step S406).

The adaptive current weighting module 324 executes the current weighting control feedback after step s406 if the voltage value of the output electric power of the standby power output terminal Vo2 is equal to the first predetermined value (step S408).

Judges whether the voltage value of the output electric power of the standby power output terminal Vo2 is less than the second predetermined value or not, if the voltage value of the output electric power of the standby power output terminal Vo2 is not equal to the first predetermined value (step S410) after step S406. Moreover, the second predetermined value is less than the first predetermined value.

The electric power feedback apparatus 32 stops operating in the burst mode if the voltage value of the output electric power of the standby power output terminal Vo2 is less than the second predetermined value (step S402) after step S410.

The compensating and clamping module 322 clamps the voltage value which is feedback to the controller 332 through the first isolation unit 328 from the constant voltage compensating module 320 after step S410 if the voltage value of the output electric power of the standby power output terminal Vo2 is not less than the second predetermined value (namely, the voltage value of the output electric power of the standby power output terminal Vo2 is between the first predetermined value and the second predetermined value). Therefore, the constant voltage compensating module 320 enters the constant voltage clamping mode (step S412).

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An electric power feedback apparatus electrically connected to a power supply apparatus, the power supply apparatus comprising a power supply module, a first inductive resistor, a second inductive resistor, a main power output terminal and a standby power output terminal, the main power output terminal and the standby power output terminal electrically connected to a power conversion system, the power supply module comprising a first power output terminal and a second power output terminal, the first inductive resistor electrically connected to the first power output terminal and the main power output terminal, the second inductive resistor electrically connected to the second power output terminal and the standby power output terminal, the electric power feedback apparatus comprising:
   a constant voltage compensating module electrically connected to the main power output terminal;
   a compensating and clamping module electrically connected to the standby power output terminal, the constant voltage compensating module, and the power conversion system, the compensating and clamping module comprising:
   a first comparator electrically connected to the standby power output terminal;
   a constant voltage weighting unit electrically connected to the first comparator; and
   a switch element electrically connected to the constant voltage compensating module, the constant voltage weighting unit and the power conversion system;
   an adaptive current weighting module electrically connected to the standby power output terminal, the second power output terminal, the constant voltage compensating module and the power conversion system; and
   a controller electrically connected to the constant voltage compensating module and the power supply apparatus.

2. The electric power feedback apparatus in claim 1, further comprising:
   a first isolation unit arranged between the constant voltage compensating module and the controller, a signal transmitting terminal of the first isolation unit electrically connected to the constant voltage compensating module, a signal receiving terminal of the first isolation unit electrically connected to the controller.

3. The electric power feedback apparatus in claim 1, wherein the adaptive current weighting module comprises:
   an amplifier electrically connected to the standby power output terminal and the second power output terminal;
   a switchover element electrically connected to the comparator and the power conversion system; and
   an inverter electrically connected to the switchover element and the constant voltage compensating module.

4. The electric power feedback apparatus in claim 3, further comprising a standby power detection module electrically connected to the standby power output terminal and the controller.

5. The electric power feedback apparatus in claim 4, wherein the standby power detection module comprises:
   a second comparator electrically connected to the standby power output terminal; and
   a start element electrically connected to the second comparator, the controller and the power conversion system.

6. The electric power feedback apparatus in claim 5, further comprising a second isolation unit arranged between the standby power detection module and the controller, a signal transmitting terminal of the second isolation unit electrically connected to the start element of the standby power detection module, a signal receiving terminal of the second isolation unit electrically connected to the controller.

7. The electric power feedback apparatus in claim 6, further comprising an inverting element arranged between the second isolation unit and the controller, the inverting element electrically connected to the signal receiving terminal of the second isolation unit and the controller.

* * * * *